Figure 1:
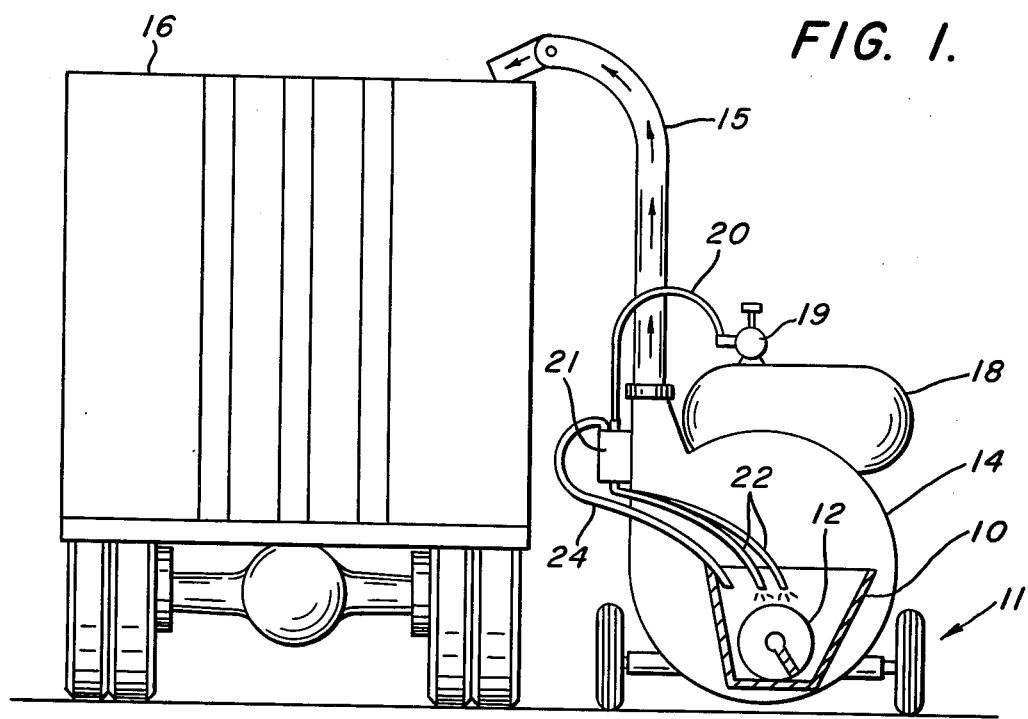

United States Patent [19]

Hudson

[11] 4,069,029
[45] Jan. 17, 1978

[54] PROCESS AND APPARATUS FOR PRODUCING AND USING COLD AMMONIA

[75] Inventor: John William Hudson, Atlanta, Ga.

[73] Assignee: United States Steel Corporation, Pittsburgh, Pa.

[21] Appl. No.: 726,704

[22] Filed: Sept. 27, 1976

[51] Int. Cl.² .................................................. F17C 7/02
[52] U.S. Cl. .......................................... 62/51; 55/191; 71/61; 111/7; 159/6 R; 426/69
[58] Field of Search ............... 62/51, 45; 55/189, 191; 159/6 R; 111/7; 71/61; 426/69

[56] References Cited

U.S. PATENT DOCUMENTS

| 2,843,534 | 7/1958 | Harper | 159/6 R |
| 3,753,723 | 8/1973 | Henderson et al. | 426/69 |
| 3,913,340 | 10/1975 | Hurley | 62/45 |
| 3,978,681 | 9/1976 | Kjelgaard et al. | 62/51 |

Primary Examiner—Ronald C. Capossela
Attorney, Agent, or Firm—W. Gary Goodson

[57] ABSTRACT

Cold ammonia, preferably cold liquid anhydrous ammonia at substantially ambient or atmospheric pressure is applied (1) to the soil as a fertilizer and (2) to feed grains, forages and anaerobically fermentable plant material to supply thereto and provide therein nonprotein nitrogen (NPN). The cold ammonia is obtained by (1) introducing a stream of ambient temperature, pressurized liquid ammonia at a velocity of at least about 5000 feet per minute into an expansion chamber, (2) imparting a high velocity spinning motion to the liquid ammonia entering the chamber such that rapid flow is produced around the interior of the chamber to thereby provide rapid separation of the liquid and gaseous ammonia formed in the chamber. Cold ammonia, which is predominantly in the liquid form, is recovered from the expansion chamber operated under substantially adiabatic conditions, at a temperature of about $-28°$ F.

33 Claims, 6 Drawing Figures

U.S. Patent  Jan. 17, 1978  Sheet 1 of 2  4,069,029

PROCESS AND APPARATUS FOR PRODUCING AND USING COLD AMMONIA

FIELD OF THE INVENTION

This invention relates to the utilization of ammonia. One aspect of this invention relates to the utilization of ammonia as a soil fertilizer. Another aspect of this invention relates to the utilization of ammonia in the treatment of feed grains and forage such as in the preparation of silage to provide therein non-protein nitrogen (NPN). Still another aspect of this invention involves the utilization of ammonia in the treatment of food and feed products, including small grains, corn, hay and the like prior to storage to prevent spoilage, such as spoilage due to fungi.

BACKGROUND OF THE INVENTION

Ammonia is applied to soils as a nitrogen fertilizer and to silage as a non-protein nitrogen source. The ammonia used for these purposes is usually stored in compressed form as a liquid at ambient temperature. Because of its vapor pressure, liquid ammonia at ambient storage is generally under a pressure of about 80 to about 200 psig. Conventionally, ammonia is applied to soils by injection through a series of so-called knives, which are pulled through the soil at a depth of about 6 to 15 inches. The ammonia is supplied from a pressure tank through a metering valve and discharged behind the tip of each knife. The pressure of the ammonia is released partly at the metering valve and partly at the knife end. Since the expansion of compressed ammonia occurs instantaneously, an intimate mixture of vapor and droplets form at the point of expansion.

Ammonia is also used to treat forage in the preparation of silage to provide a non-protein nitrogen source suitable for animal consumption. In this case, ammonia is applied directly to freshly cut forage material such as corn or sorghum.

Ammonia in the form of an aqueous solution has been applied to anerobically fermentable plant material for silage production to provide feed for ruminant animals, the applied ammonia being converted to nitrogen compounds providing non-protein nitrogen (NPN) which is consumable by ruminant animals, as taught, for example, in U.S. Pat. No. 3,753,723, incorporated herein by reference. In field applications such as in soil fertilization and trench silage production, this method has serious disadvantages due to the necessity of carrying a separate water supply along with the ammonia and other field equipment. A more economical and simpler method of application of ammonia to soils and silage is described by W. L. Kjelgaard and P. M. Anderson in U.S. patent application Ser. No. 506,516, filed Sept. 16, 1974, now U.S. Pat. No. 3,978,681 incorporated herein by reference, which discloses a method in which the pressure of the compressed, liquid ammonia is released prior to application in an expansion chamber which separates the gas from the liquid. Both phases are then applied to the soil or silage separately, thereby allowing a more uniform flow and a safer non-pressure application. An additional advantage of this method is that it permits, in the case of soils, the application of ammonia with a conventional disc harrow or cultivator instead of a special knife applicator. Since the cold liquid and gaseous ammonia produced by this process does not flash or sputter at substantially atmospheric pressure as easily as when pressurized liquid ammonia is applied to the soil directly in the prior art process, the cold ammonia can be applied to the top of the soil or at much shallower depths in combination with the field cultivator so that the cold ammonia thus applied is covered immediately by the soil turned over by the field cultivator. Thus a separate trip over the field to apply ammonia is eliminated. This results in fuel, labor, and machinery wear savings. Also eliminated is the need for knife maintenance and replacement costs.

The Kjelgaard-Anderson expansion chamber is designed to utilize gravity for the separation of the gaseous and liquid ammonia. In essence, the ammonia is introduced in the center of the chamber through an inlet pipe from which the liquid phase falls to the bottom and the gas rises to the top. Each phase is discharged through pipes in the bottom and the top, respectively. To improve the separation, both discharge exists are shielded with a baffle plate to avoid entrainment of liquid with the gas phase, and vice versa.

The liquid phase is then passed through a distribution device which divides the flow into several streams of equal portions to be applied to the soil through individual hoses. Gaseous ammonia is similarly applied through another set of hoses.

The shortcoming of the Kjelgaard-Anderson device is mainly in the rather inefficient phase separation in the expansion chamber. In applications of ammonia to soils, relatively large quantities of ammonia have to be expanded and separated into the liquid and gas phases. Rates of up to 8,000 pounds per hour are not uncommon. To separate ammonia at such high rates requires a very large expansion chamber of the Kjelgaard-Anderson design. Thus, a device which would avoid the need for a large and heavy piece of equipment is highly desirable and useful. Since the expansion chamber may be moved from one piece of field equipment to another by the farmer or other end user, it is very important that the size and weight of the expansion chamber be such that it can readily be moved by hand by a few and preferably one individual.

BRIEF DESCRIPTION OF THE INVENTION AND FIGURES

This invention relates to a method and apparatus for carrying out the substantially adiabatic expansion of a pressurized stream of ambient-temperature liquid ammonia to produce a stream of cold liquid ammonia at substantially ambient or atmospheric pressure and a stream of cold gaseous ammonia at substantially ambient or atmospheric pressure. The method includes the steps of (1) introducing at a velocity of at least about 5000 feet per minute a stream of ambient-temperature, pressurized liquid ammonia into an expansion chamber, (2) imparting a high velocity spinning motion to the liquid ammonia entering the chamber such that a rapid flow is produced around the interior of the chamber to thereby provide rapid separation of the liquid and gaseous ammonia formed in the chamber, and wherein the expansion chamber is provided with a first outlet useful for the removal of gaseous ammonia from the chamber and which first outlet is located above the path of centrifugal flow and second outlet useful for the removal of cold liquid ammonia therefrom, the outlets being provided at opposite ends of the expansion chamber, (3) directing the flow of the cold substantially ambient or atmospheric pressure liquid ammonia within said expansion chamber to the second outlet to effect separation between cold liquid ammonia and cold gaseous ammonia within the expansion chamber, and (4) withdrawing through the first outlet a stream of cold gaseous ammonia at substantially ambient or atmospheric pressure and a stream of cold liquid ammonia at substantially ambient or atmospheric pressure from the second outlet. Preferably the pressurized liquid ammonia is introduced through a feed line entering the expansion chamber at a point about midway up the vertical dimension of the chamber wall. Preferably the expansion chamber is a vertically elongated cylinder and has a volume of less than about 8 cubic feet. However, in order for the method and apparatus of this invention to be suitable for use where ammonia flow rates in excess of about 3000 pounds per hour are necessary, which is a common need for use in application to the soil by large field cultivators, it has been found necessary to (1) direct the cold gaseous ammonia stream which leaves the expansion chamber through a mist eliminator such as a stationary fan mist eliminator to thereby separate liquid ammonia droplets suspended in the gaseous stream, and (2) collect the separated liquid ammonia from the gaseous stream and combine it with the cold liquid ammonia stream from the expansion chamber. Failure to remove the suspended liquid droplets from the gaseous stream at flow rates in excess of about 3000 pounds per hour results in the production of large amounts of gaseous ammonia in the gaseous ammonia product stream due to vaporization of these liquid droplets. This large excess of gaseous ammonia is more difficult to incorporate into the soil and may result in costly ammonia losses or an unmanageable number of distributor lines for the gaseous ammonia. Thus for the soil application where the flow rate is in excess of about 3000 pounds per hour some of the chief advantages of the cold liquid ammonia process would be lost unless a mist eliminator is used in the manner described above. The Kjelgaard and Anderson device is generally objectionable at these flow rates in excess of about 3000 pounds per hour due to the extemely large, heavy and cumbersome chambers which would be required to handle such flow rates. Also, the much larger size devices would present serious problems in providing safety checks in case one or both outlets became plugged and resulted in pressure buildup inside the device. Reinforcing an already objectionably heavy device would generally be unsatisfactory.

This invention also includes a method for treating soil comprising (1) producing a stream of cold liquid ammonia at substantially ambient or atmospheric pressure according to the above described method and (2) dividing the cold liquid ammonia stream into two or more separate streams and applying these separate streams to the ground in a spaced arrangement and then covering the thus applied ammonia with additional soil to prevent loss of ammonia into the atmosphere. Furthermore, this invention includes a method to provide an improved animal feed by addition of ammonia as a non-protein nitrogen. The process includes the steps of (1) forming a separate cold liquid ammonia stream and a separate cold gaseous ammonia stream at substantially ambient or atmospheric pressures according to the above described method and (2) applying these ammonia streams to forage in quantities and in a manner to provide substantially uniform distribution of ammonia throughout the forage. The invention also includes the apparatus suitable for practicing these methods. The invention can also be used in applying ammonia to foods and other products where ammonia may act to prevent deterioration of the products or serve another benefical function.

By means of this invention, it is now possible to produce cold liquid ammonia at substantially ambient or atmospheric pressures at very high flow rates by means of a very light, compact expansion chamber which is easily moved by hand for installation or other purposes. Furthermore, necessary safety features such as pressure capability can be provided without significantly sacrificing the compactness or light weight advantages of the invention.

Figure 2:
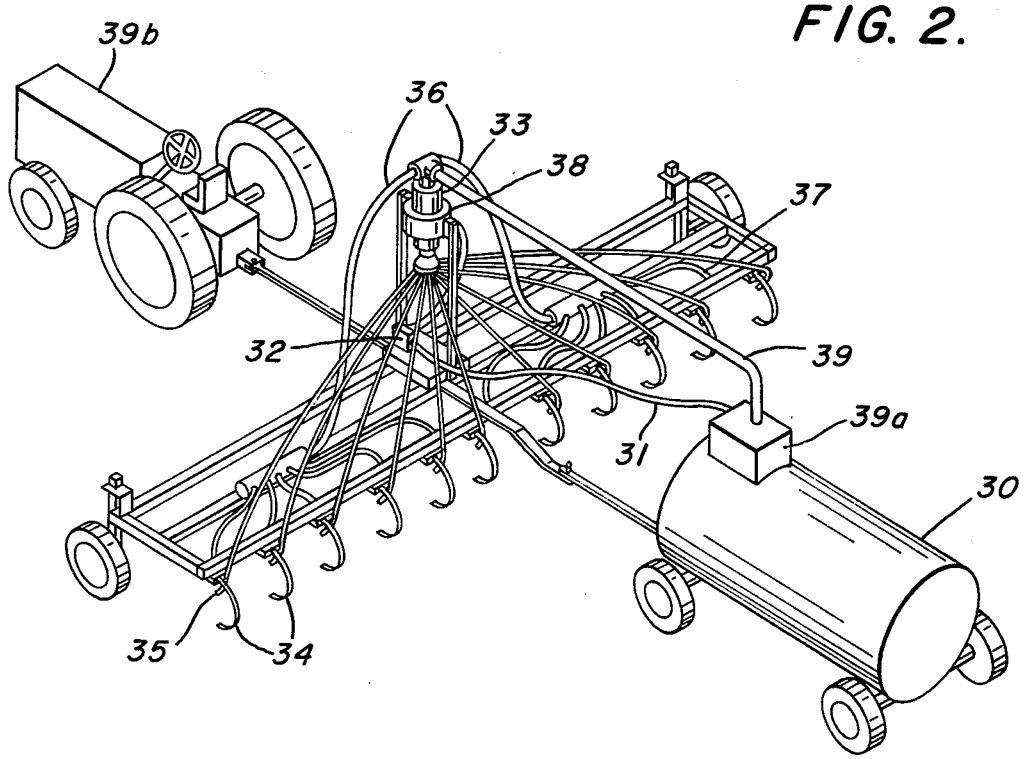
Figure 3:
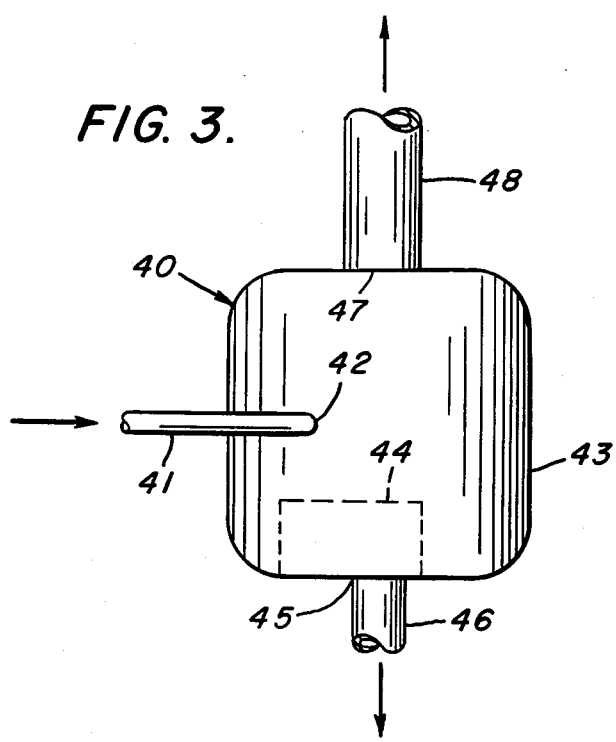
Figure 5:
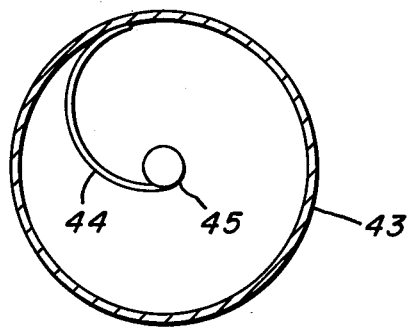
Figure 4:
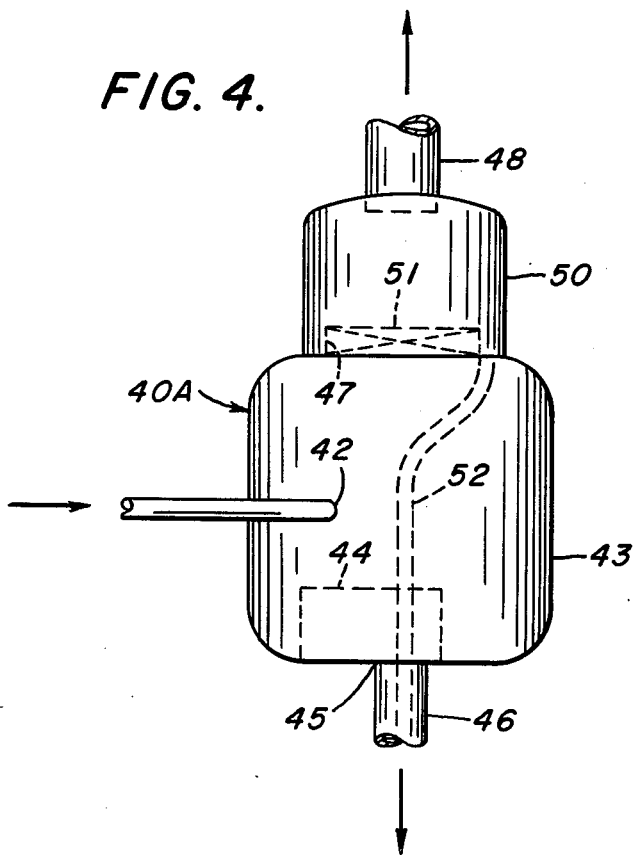
Figure 6:
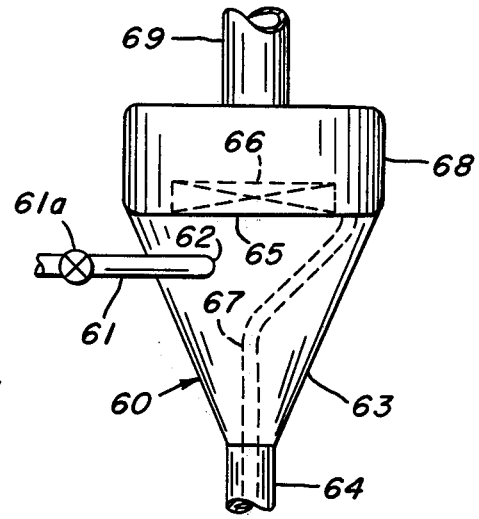

FIG. 1 schematically illustrates the practice of this invention in the embodiment wherein cold ammonia is applied directly to freshly cut forage material before loading in a truck and transportation for storage to produce silage;

FIG. 2 schematically illustrates another embodiment of the practice of this invention wherein cold anhydrous ammonia is applied for soil fertilization;

FIGS. 3, 4 and 6 schematically illustrate apparatus or structure in accordance with this invention for the expansion of a stream of pressurized, liquid, ambient temperature, ammonia into two separate streams of cold ammonia at substantially ambient or atmospheric pressure, one stream being cold gaseous ammonia and the other stream being cold liquid ammonia; and FIG. 5 illustrates in cross-section of a preferred embodiment of the bottom of the apparatus of FIGS. 3 and 4.

PREFERRED EMBODIMENT(S)

The ammonia useful in this invention is preferably anhydrous ammonia. However the term includes ammonia containing other materials, preferably in minor amounts, such as water, insecticides, fungicides, nitrapyrin, plant nutrients or any other material that does not adversely affect the operation of the process. These other materials may be part of the ammonia in the pressurized tank of ammonia or may be added in the expansion chamber or at another suitable point in the process of this invention.

The expansion chamber of this invention may be of any suitable shape which will allow spinning flow to provide separation of the cold liquid ammonia from the cold gaseous ammonia in the chamber. Generally preferred is an axially elongated chamber more preferably a vertically elongated cylindrical chamber. Preferably, the inlet for the pressurized liquid ammonia is at about the mid-point of the vertical distance of the chamber wall. Unless indicated to the contrary, it is intended that the term "expansion chamber" includes the feed line connecting the pressurized liquid ammonia vessel and the inlet of the expansion chamber. Generally, this feed line will contain a control valve. Opening the control valve to cause the pressurized liquid ammonia to flow from the pressure tank to the main body of the expansion chamber will result in the ammonia in the feed line having a reduced pressure from that in the pressure tank. The pressure in the pressure container is generally between about 80 and about 200 psig, with 100-150 psig being most common. The pressure at the point in the feed line located at the inlet to the main body of the expansion chamber may vary depending upon the size of the inlet to the chamber, the ammonia flow rate in this line and like factors. However, the pressure at this point will generally be between about 5 and about 35 psig.

The pressurized liquid ammonia is preferably introduced into the main body of the expansion chamber to provide tangential entry therein to impart a high velocity spinning motion to the liquid ammonia entering the chamber so that rapid flow is produced in the interior of the chamber to thereby provide rapid separation of liquid and gaseous ammonia. The introduction velocity of the pressurized liquid ammonia is at least 5,000 feet per minute and preferably has a velocity between about 10,000 and about 15,000 feet per minute. The flow rate of the pressurized liquid ammonia entering the chamber is between about 500 and about 8000 pounds per hour and preferably between about 3000 to about 8000 pounds per hour. In applying ammonia to forage used for making silage flow rates between about 500 and about 2000 pounds per hour are common. A common rate of application to forage is about 6 to 8 pounds of ammonia per ton. For application of ammonia to the soil, a flow rate into the expansion chamber of between about 2000 and about 8000 pounds per hour is common. The amount of ammonia applied to the soil may vary according to the needs of the particular crop or the deficiency of the soil or other well known factors. About 400 pounds of ammonia per acre is a typical soil application rate.

The percentage of pressurized liquid ammonia converted to cold gaseous ammonia in the expansion chamber is generally between about 15 and about 25% and more typically between about 18 and about 22%. This percentage will vary depending upon the composition of the ammonia, the pressure in the chamber and on other factors known to the art.

The cold liquid ammonia in the main body of the expansion chamber is directed to the outlet at the bottom of the chamber. This is accomplished by a barrier means such as a barrier strip with one end of the strip located at the bottom edge of the vertical chamber wall and the other end of the strip located at the outlet for the cold liquid ammonia.

Preferably, this barrier strip is a spiral shaped strip which provides a smooth flow of cold liquid ammonia from the chamber wall to the outlet for the cold liquid ammonia. The means for directing the cold liquid ammonia to the outlet can be accomplished by other means such as by having a conical shaped expansion chamber such that the narrowest portion of the cone leads into the outlet for the cold liquid ammonia.

The mist eliminator for eliminating suspended droplets of liquid ammonia from the cold gaseous ammonia leaving the expansion chamber through the outlet for the cold gaseous ammonia may be of any suitable form to separate the liquid ammonia droplets from the cold gaseous stream. It has, however, been found that a stationary fan mist eliminator preferably located at the outlet for the cold gaseous ammonia is an extremely effective form of mist eliminator which is also simple and does not detract from the compactness of the expansion chamber. Preferably, this stationary fan mist eliminator is part of a separate chamber combined with the expansion chamber to form a unitary device.

The expansion chamber of this invention is provided with a distributor system comprising product lines generally in the form of tubes leading from the different outlets from the chamber. The size of the tube for the cold gaseous ammonia is selected such that the ammonia going into the soil, forage or other product can flow without back pressure.

The distributor system for the cold liquid ammonia is not quite so critical but the flow must be regulated so that loss of liquid is avoided due to splashing etc. The inside diameter of distributor tubing useful for cold liquid ammonia may preferably be between ¼ inch and about 1 inch and the inside diameter of tubing for the cold gaseous ammonia may preferably be between about ¾ inch and about 2 inches.

The cold gaseous ammonia in one embodiment of this invention may be recycled to a compressor for the gaseous ammonia and reintroduced as a liquid to the pressurized liquid ammonia tank or any pressurized lines attached thereto. The field cultivator is defined herein to include any apparatus useful for cultivating the soil such as a harrow, disc, plow or any combination thereof.

The expansion chamber of this invention preferably has a weight of less than about 100 pounds and a volume of less than about 8 cubic feet. More preferably, the expansion chamber has a weight of less than about 50 pounds and a volume of between about ½ and about 2 cubic feet.

By way of comparison, a preferred expansion chamber of this invention is attached to a field cultivator and used to apply ammonia to the soil at the rate of 6000 pounds per hour. The expansion chamber with a volume of 8/10 cubic foot is cylindrical in shape and contains a stationary fan mist eliminator at the expansion chamber outlet for cold gaseous ammonia. The weight of the expansion chamber plus the chamber containing the mist eliminator is 30 pounds. A prior art device having an expansion chamber containing two baffles is in the form of a brick shaped box having outside dimensions of 18 inches by 18 inches by 36 inches and has a weight of about 200 pounds. This 200 pound apparatus is also used on a field cultivator to apply ammonia to the soil at the maximum rate flow of 4000 pounds per hour. The rate of retention in the soil is about the same with both devices. When the dimensions of the 200 pound expansion chamber are reduced and the weight is correspondingly reduced the flow rate of ammonia that can be put through this expansion chamber is also correspondingly reduced.

FIG. 1 of the drawings illustrates one embodiment of this invention wherein a mixture of cold gaseous anhydrous ammonia and cold liquid anhydrous ammonia at a temperature of about −28° F, is applied at substantially atmospheric pressure to freshly cut or harvested plant material suitable for silage production. As illustrated, conveyor body 10 carried on towed or self-propelled wheeled vehicle, generally indicated by reference numeral 11, is provided with an endless conveyor 12, such as a helical disc conveyor. Conveyor 12 serves to transport the plant material added to conveyor body 10 to blower 14 for discharge via chute 15 into truck 16 for transport to the silo for storage of the plant material for silage production.

The plant material put into conveyor body 10 has applied thereto cold, atmospheric pressure anhydrous ammonia in accordance with this invention. Ammonia is supplied from tank 18 carried on vehicle 11. Tank 18 contains pressurized liquid anhydrous ammonia at substantially ambient temperature, such as a temperature in the range 50°–100° F, more or less, depending upon the environment. Pressurized liquid ammonia leaves tank 18 through adjustable control valve 19 and conduit 20 and enters expansion chamber 21. The pressurized ambient temperature liquid anhydrous ammonia is supplied to and adiabatically expanded within expansion chamber 21 at a rate such that a major amount of the supplied pressurized ambient temperature liquid anhydrous ammonia is converted to a major amount of cold anhydrous liquid ammonia at substantially atmospheric pressure, with the remaining minor amount being converted to cold gaseous anhydrous ammonia.

The cold liquid anhydrous ammonia at substantially atmospheric pressure leaves expansion chamber 21 via outlet pipes 22 and the cold gaseous anhydrous ammonia at substantially atmospheric pressure leaves expansion chamber 21 via outlet pipes 24. The cold liquid anhydrous ammonia and the cold gaseous anhydrous ammonia issuing from expansion chamber 21 via outlet pipes 22 and 24, respectively, are discharged directly into contact with and/or applied directly onto the plant material being handled and conveyed within conveyor body 10 for discharge via blower 14 and chute 15 into truck 16.

FIG. 2 of the drawings illustrates the location of cold ammonia to the soil. The field cultivator 34 in the form of a field cultivator such as a disc, harrow, or plow has attached thereto an expansion chamber 33 of the type described in this invention. Ammonia is supplied from pressure tank 30 through conduit 31 to expansion chamber 33. The pressurized liquid ammonia leaves tank 30 through adjustable control valve 32 and the conduit 31 and enters expansion chamber 33. The conduit 31 enters the expansion chamber 33 at an inlet 38 about midway up the vertical side of the expansion chamber. The pressurized liquid ammonia enters the expansion chamber 33 tangentially to the inside of the chamber to impart a high velocity spinning motion to the pressurized ammonia to thereby separate the gaseous and liquid ammonia in the expansion chamber 33. The cold liquid ammonia at substantially atmospheric or ambient pressure leaves the bottom of the expansion chamber through distributor tubes 35 which are spaced in such a manner that liquid ammonia is applied to the ground at substantially equal spacings in front of the blades of the field cultivator and this liquid ammonia is immediately covered by soil by the action of the field cultivator being moved across the field by the tractor 39b. The liquid ammonia may be applied to the top of the soil or by shallow blades just below the surface of the soil. About 15 to about 25% of the pressurized liquid ammonia from the pressure tank is converted to gaseous ammonia in the expansion chamber 33. This gaseous ammonia may be delivered to the field through conduit 36 which is positioned on the cultivator such that the ends 37 are below the soil, preferably about 2 to 3 inches below the surface of the soil. On the other hand, the cold gaseous ammonia can be recycled through conduit 39 to compressor 39a which compresses the gaseous ammonia to form liquid ammonia and redeliver it to the pressure tank 30 for reuse.

FIG. 3 of the drawings illustrates a schemmatic of one embodiment of an expansion chamber useful in this invention for the adiabatic invention of ambient temperature pressurized liquid ammonia. The expansion chamber, generally indicated by reference number 40 comprises a closed chamber or container 43, which chamber is preferably axially elongated and more preferably in the form of a vertically elongated cylinder. Any shape for the expansion chamber is suitable so long as flow is produced which results in separation of cold gaseous ammonia from cold liquid ammonia. Inlet opening 42 has welded thereon inlet pipe 41. Inlet pipe 41 is preferably connected through opening 42 in such a manner that pressurized liquid ammonia passing through inlet 42 into closed container 43 enters in a tangential direction in order to impart high velocity spinning motion to the liquid ammonia in the chamber such that rapid flow is produced around the interior circumference of the chamber to thereby provide rapid separation of the liquid and gaseous ammonia in the chamber. A barrier means 44 preferably in the form of a barrier strip, has one end of the barrier means 44 adjacent to the vertical wall of the container 43 and another portion of the barrier means such as the other end adjacent to the outlet for the cold liquid ammonia 45 such that the flow of cold substantially ambient or atmospheric pressure liquid ammonia is directed from the chamber walls to the outlet 45 useful for withdrawal of the cold liquid ammonia from the expansion chamber 42 through outlet conduit 6. The cold gaseous ammonia is passed out of the chamber 43 through outlet 47 and on through conduit 48. The outlet 47 is located above the inlet 42 and above the flow of the cold liquid ammonia. The outlet 45 for the cold liquid ammonia is located below the inlet 42 and on opposite end of the chamber 43 from outlet 47 for the cold gaseous ammonia. FIG. 4 is substantially identical to FIG. 3 and the descriptive material for FIG. 3 applies except for the addition of the mist eliminator 51 located at the outlet 47 for the cold gaseous ammonia. The cold gaseous ammonia flows through the mist eliminator located in closed chamber 50 to eliminate the suspended droplets of cold liquid ammonia in cold gaseous ammonia stream passing through the outlet 47. The mist eliminator may be in any of the acceptable forms known to the art. However, the stationary blade mist eliminator is especially preferred because it does not detract from the simplicity, compactness and light weight of the expansion chamber 40 as the cold gaseous ammonia passes through outlet 47 into mist eliminator 51 wherein the droplets of cold liquid ammonia are thrown to the inside surface of chamber 50 and the liquid ammonia thus collected passes through conduit 52 to rejoin the cold liquid ammonia passing through outlet 45 and conduit 46. The cold gaseous ammonia leaving the mist eliminator 51 passes out of chamber 50 to conduit 48.

FIG. 5 shows a cross section of the bottom of FIGS. 3 and 4. This figure shows a preferred embodiment wherein the barrier means 44 is in the form of spiral with one end of the barrier means connected to the side of the vertical wall of chamber 43 and the other end of the spiral barrier means 44 is connected to the outlet 45 for the cold liquid ammonia. Thus, the cold substantially ambient or atmospheric pressure ammonia is directed in a smooth flow from the vertical walls of chamber 43 to the outlet 45 where it is removed from the expansion chamber.

FIG. 6 is a view of another embodiment of the expansion chamber of this invention. This expansion chamber is very similar to that of FIG. 4 except that the chamber wall 63 is in the form of a cone in which the narrow part of the cone leads into the outlet 64 for removing the cold liquid ammonia from the expansion chamber. Pressurized liquid ammonia passes through control valve 61a on through conduit 61 to inlet 62 preferably in a tangential direction to the chamber wall to produce high velocity spinning motion about the interior circumference of the conical shaped chamber 63 to thereby provide centrifugal flow and rapid separation of the liquid and gaseous ammonia in the chamber 63.

The cold liquid ammonia passes through outlet 64 and the cold gaseous ammonia passes through outlet 65 through mist eliminator 66 where the suspended droplets of liquid ammonia in the gaseous ammonia stream are collected and passed through conduit 67 to outlet 64 where the collected ammonia joins the main body of cold liquid ammonua leaving the expansion chamber 60. The cold gaseous ammonia then passes on through chamber 68 through outlet conduit 69.

One of the important features of this invention is the compactness, simplicity and light weight of the expansion chamber of this invention even though this expansion chamber has the capability of handling large flow rates such as between about 3000 and about 8000 pounds per hour. The expansion chamber of this invention also can readily be strengthened for safety purposes in case of pressure buildup inside the chamber. For example, the main body of the expansion chamber can be made from cylindrical shaped metal generally used for making pressure vessels. Thus, the main body of the expansion chamber of this invention suitable for withstanding high pressures can be very inexpensively built. The relative size of the mist eliminator and the main body of the expansion chamber will depend upon the type of mist eliminator utilized.

The following example illustrates this invention.

EXAMPLE

An expansion chamber in the form shown in FIG. 4 wherein the closed container 43 is in the form of a vertically elongated cylinder having a diameter of 12 inches and a height of 12 inches and a closed chamber 50 in the form of a vertically elongated cylinder having a diameter of 8 inches and a height of 6 inches and being attached to the chamber 43 to form a unitary structure. The inlet conduit 41 is in the form of a 1 inch diameter pipe. The outlet conduit 48 for the cold gaseous ammonia is in the form of a 3 inch pipe leading to the distribution manifold. The outlet conduit 46 for cold liquid ammonia is in the form of a 2 inch diameter pipe. The pressurized liquid ammonia was maintained in a pressure tank at a pressure of 120 psig. The other conditions and performance are indicated in the Table I.

TABLE I

| Flow Rate (lb/hr) | Pressure, Psig | | | Performance |
| --- | --- | --- | --- | --- |
| | Inlet | Expansion Chamber | Mist Eliminator Chamber | |
| 500 | — | <1.0 | 1.0 | Clean Separation |
| 2000 | 10 | <1.0 | 1.0 | Clean Separation |
| 4000 | 20 | <1.0 | 1.0 | Clean Separation |
| 6000 | 20 | 1.0 | 1.2 | Clean Separation |
| 9000 | — | — | — | Droplets in Vapor |

The cold ammonia thus produced is then applied to the soil and to forage as described in the description of FIGS. 1 and 2.

I claim:

1. A method for carrying out the substantially adiabatic expansion of a pressurized stream of ambient-temperature liquid ammmonia to produce a stream of cold liquid ammonia at substantially ambient or atmospheric pressure and a stream of cold gaseous ammonia at substantially ambient or atmospheric pressure, which comprises (1) introducing at a velocity of at least about 5000 feet per minute a stream of ambient-temperature, pressurized liquid ammonia into an expansion chamber, (2) imparting a high velocity spinning motion to the liquid ammonia entering the chamber such that rapid flow is produced around the interior of the chamber to thereby provide rapid separation of the liquid and gaseous ammonia in the chamber, and wherein the expansion chamber is provided with an outlet useful for the removal of gaseous ammonia therefrom which outlet is located above the path of liquid flow and another outlet useful for the removal of cold liquid ammonia therefrom, said outlets being provided at opposite ends of said expansion chamber, (3) directing the flow of the cold substantially ambient or atmospheric pressure liquid ammonia within said expansion chamber to said outlet useful for the withdrawal of cold ambient or atmospheric pressure liquid ammonia from said expansion chamber to effect separation between cold liquid ammonia and cold gaseous ammonia within said expansion chamber, and (4) withdrawing through said outlet useful for the removal of gaseous ammonia a stream of cold gaseous ammonia at substantially ambient or atmospheric pressure and a stream of cold liquid ammonia at substantially ambient or atmospheric pressure via said other outlet.

2. Method of claim 1 wherein the stream of ammonia entering the expansion chamber enters at a flow rate of between about 500 and about 8000 pounds per hour.

3. Method of claim 2 wherein the expansion chamber has a weight of less than about 100 pounds and the volume of the expansion chamber is less than about 8 cubic feet.

4. Method as in claim 3 wherein between about 15 and about 25 percent of the pressurized liquid ammonia entering the expansion chamber is converted to gaseous ammonia which cools the balance of the liquid ammonia in the chamber so that it remains in the liquid state at substantially ambient or atmospheric pressures and wherein the volume of the expansion chamer is between about 0.4 and about 2 cubic feet.

5. Method as in claim 1 wherein the expansion chamber is in the form of a vertically elongated cylinder and wherein the liquid ammonia is introduced through an opening near the mid-point of the vertical height on the cylinder wall.

6. Method as in claim 5 wherein the bottom of the expansion chamber contains a barrier strip to break the spinning motion and thereby facilitate the discharge of the liquid ammonia from the expansion chamber through the outlet for the cold liquid ammonia.

7. Method as in claim 1 additionally comprising (1) directing the cold gaseous ammonia stream which leaves the expansion chamber through a mist eliminator to thereby separate liquid ammonia droplets suspended in the gaseous stream, and (2) collecting the separated liquid ammonia from the gaseous stream and combining it with the cold liquid ammonia stream from the expansion chamber.

8. Method as in claim 7 wherein the expansion chamber and mist eliminator are combined into one unitary apparatus wherein combination apparaus has a total weight of less than 100 pounds and wherein the high pressure liquid ammonia is being introduced into the expansion chamber at a flow rate of from about 3000 to about 8000 pounds per hour.

9. Method as in claim 8 wherein the expansion chamber is in the form of a vertically elongated cylinder and wherein the high pressure liquid ammonia is introduced through a control valve in a feed line which enters an opening near the mid-point of the vertical height of the cylinder wall.

10. Method as in claim 7 wherein between about 15 and about 25 weight percent of the high pressure liquid ammonia entering the expansion chamber is converted into gas thereby cooling the liquid and gaseous ammonia in the expansion chamber.

11. Method as in claim 7 wherein a barrier strip is utilized at the bottom of the expansion chamber to guide the flow of the cold liquid ammonia flowing around the inside of the expansion chamber to the outlet for the cold liquid ammonia.

12. A method of treating soil comprising (1) producing a stream of cold liquid ammonia at substantially ambient or atmospheric pressure and a separate stream of cold gaseous ammonia at substantially ambient or atmospheric pressure according to the method of claim 7 and (2) dividing the cold liquid ammonia stream into two or more separate streams and applying these separate streams to the ground in a spaced arrangement and the covering the liquid ammonia which has been applied to the soil with additional soil to prevent loss of ammonia into the atmosphere.

13. Method as in claim 12 wherein the gaseous ammonia stream is directed below the surface of the soil and at the same time the cold liquid ammonia streams and gaseous ammonia streams are regulated to obtain substantially uniform coverage of the soil with ammonia for crop fertilization purposes.

14. Method as in claim 13 wherein the expansion chamber and liquid and gaseous streams going into the soil are mounted on a field cultivator being used in the field to break up the ground and fertilize the ground in preparation for growing of crops.

15. Method of applying ammonia to forage for use as animal feed comprising (1) forming a separate cold liquid ammonia stream and a separate cold gaseous ammonia stream at substantially ambient or atmospheric pressures according to the method of claim 7 and (2) applying these ammonia streams to forage in quantities and in a manner to provide substantially uniform distribution of ammonia throughout the forage to provide an improved animal feed.

16. A method for carrying out the substantially adiabatic expansion of a pressurized stream of ambient-temperature liquid ammonia to produce a stream of cold liquid anhydrous ammonia at substantially ambient or atmospheric pressure and a stream of cold gaseous ammonia at substantially ambient or atmospheric pressure, which comprises (1) introducing a stream of ambient temperature, pressurized liquid ammonia at a pressure between about 80 and about 200 psig through a flow control valve tangentially into a cylinderical expansion chamber having a weight of less than about 100 pounds at a location on the chamber walls about midway from the top and bottom of the chamber, (2) imparting a high velocity spinning motion to the liquid ammonia entering the chamber such that rapid flow is produced around the interior circumference of the chamber to thereby provide rapid separation of the liquid and gaseous ammonia in the chamber, and wherein the chamber is provided with an outlet useful for the removal of cold liquid ammonia therefrom, said outlets being provided at opposite ends of said expansion chamber, (3) directing the flow of the cold substantially ambient or atmospheric pressure liquid ammonia from the chamber walls to said outlet useful for the withdrawal of cold ambient or atmospheric pressure liquid ammonia from said expansion chamber to effect separation between cold liquid ammonia and cold gaseous ammonia within said expansion chamber and (4) withdrawing through said outlet useful for the removal of gaseous ammonia a stream of cold gaseous ammonia at substantially ambient or atmospheric pressure and a stream of cold liquid ammonia at substantially ambient or atmospheric pressure via said other outlet.

17. Method as in claim 16 additionally comprising (1) directing the cold gaseous ammonia stream leaving the expansion chamber through a stationary fan mist eliminator to thereby separate substantially all liquid ammonia droplets from the gaseous ammonia stream and (2) collecting this separated liquid ammonia and combining it with the cold liquid ammonia stream from the expansion chamber.

18. Method as in claim 17 wherein the liquid ammonia is introduced into the expansion chamber at a flow rate of between about 500 and about 8000 pounds per hour and has an entering velocity of greater than about 5000 feet per minute.

19. Method as in claim 18 wherein between about 15 and about 25 weight percent of liquid ammonia enter the expansion chamber is converted into gaseous ammonia which cools the liquid and gaseous ammonia in the expansion chamber.

20. Method as in claim 17 wherein the bottom of the expansion chamber contains a spiral shaped barrier strip attached to the chamber wall and the liquid outlet at the bottom of the chamber in a manner to facilitate smooth flow from the chamber wall to the outlet.

21. Method as in claim 17 wherein the cylindrical expansion chamber is in a vertical position.

22. Method as in claim 17 wherein the liquid ammonia is introduced into the expansion chamber by means of an inlet having an average diameter of between about $\frac{1}{2}$ and about 4 inches.

23. Method as in claim 18 wherein the expansion chamber and mist eliminator are combined into one unitary apparatus wherein combination apparatus has a total weight of less than 100 pounds and wherein the high pressure liquid ammonia is being introduced into the expansion chamber at a flow rate of from about 3000 to about 8000 pounds per hour.

24. A method of treating soil comprising (1) producing a stream of cold liquid ammonia at substantially ambient or atmospheric pressure and a separate stream of cold gaseous ammonia at substantially ambient or atmospheric pressure according to the method of claim 17 and (2) dividing the cold liquid ammonia stream into two or more separate streams and applying these separate streams to the ground in a spaced arrangement and then covering the liquid ammonia which has been applied to the soil with additional soil to prevent loss of ammonia into the atmosphere.

25. Method as in claim 24 wherein the gaseous ammonia stream is directed below the surface of the soil and at the same time the cold liquid ammonia streams and gaseous ammonia streams are regulated to obtain substantially uniform coverage of the soil with ammonia for crop fertilization purposes.

26. Apparatus for carrying out the substantially adiabatic expansion of a pressurized stream of ambient-temperature liquid ammonia to produce a stream of cold liquid ammonia at substantially ambient or atmospheric pressure and a stream of cold gaseous ammonia at substantially ambient or atmospheric pressure, which comprises (1) means for introducing at a velocity of at least about 5000 feet per minute a stream of ambient-temperature, pressurized liquid ammonia into an axially elongated expansion chamber, (2) means for imparting a high velocity spinning motion to the liquid ammonia entering the chamber such that rapid flow is produced around the interior of the chamber to thereby provide rapid separation of the liquid and gaseous ammonia formed in the chamber, and wherein the expansion chamber is provided with (3) a first outlet means for the removal of gaseous ammonia therefrom which outlet means is located above the path of liquid flow and (4) a second outlet means useful for the removal of cold liquid ammonia therefrom, said first and second outlet means being provided at opposite ends of said expansion chamber, (5) means for directing the flow of the cold substantially ambient or atmospheric pressure liquid ammonia within said expansion chamber to said second outlet means to effect separation between cold liquid ammonia and cold gaseous ammonia within said expansion chamber, and (6) means for withdrawing through said first outlet means a stream of cold gaseous ammonia at substantially ambient or atmospheric pressure and (7) means for withdrawing a stream of cold liquid ammonia at substantially ambient or atmospheric pressure via said second outlet means.

27. Apparatus of claim 26 wherein the stream of ammonia entering the expansion chamber enters at a flow rate of between about 500 and about 8000 pounds per hour.

28. Apparatus as in claim 27 additionally comprising means for directing the cold gaseous ammonia stream leaving the expansion chamber through a stationary fan mist eliminator means to thereby separate substantially all liquid ammonia droplets from the gaseous ammonia stream and means for collecting this separated liquid ammonia and combining it with the cold liquid ammonia stream from the expansion chamber.

29. Apparatus of claim 28 wherein the expansion chamber has a weight of less than about 100 pounds and the volume of the expansion chamber is less than about 8 cubic feet.

30. Apparatus as in claim 29 wherein between about 15 and about 25 percent of the pressurized liquid ammonia entering the expansion chamber is converted to a gaseous ammonia which cools the balance of the liquid ammonia in the chamber so that it remains in the liquid state at substantially adiabatic or atmospheric pressures and wherein the volume of the expansion chamber is between about 0.4 and about 2 cubic feet.

31. Apparatus as in claim 30 wherein the expansion chamber is in the form of a vertically elongated cylinder and wherein the liquid ammonia is introduced through a control valve in a feed line entering an opening near the mid-point of the vertical height of the cylinder wall.

32. Apparatus as in claim 31 wherein the bottom of the expansion chamber contains a barrier means in the form of a spiral strip with one end of the spiral strip near the chamber wall and the other end of the spiral strip near the second outlet means for the cold liquid ammonia such that the centrifugal flow of cold liquid ammonia at the inner surface of the chamber wall is smoothly directed to the outlet for the cold liquid ammonia in the bottom of the chamber.

33. Apparatus for treating soil comprising (1) means for producing a stream of cold liquid ammonia at substantially ambient or atmospheric pressure and a separate stream of cold gaseous ammonia at substantially ambient or atmospheric pressure according to claim 28, (2) means for dividing the cold liquid ammonia stream into two or more separate streams, (3) means for applying these separate streams to the ground in a spaced arrangement and (4) means for covering the liquid ammonia which has been applied to the soil with additional soil to prevent loss of ammonia into the atmosphere.

* * * * *